US010018741B2

(12) United States Patent
Davies et al.

(10) Patent No.: US 10,018,741 B2
(45) Date of Patent: Jul. 10, 2018

(54) SYSTEMS AND METHODS FOR SENSOR STREAMER TANGLE DETECTION

(71) Applicant: PGS Geophysical AS, Oslo (NO)

(72) Inventors: Thomas Owen Davies, Oslo (NO); Oddvar Eikeset, Oslo (NO)

(73) Assignee: PGS Geophysical AS, Oslo (NO)

( * ) Notice: Subject to any disclaimer, the term of this patent is extended or adjusted under 35 U.S.C. 154(b) by 238 days.

(21) Appl. No.: 14/867,144

(22) Filed: Sep. 28, 2015

(65) Prior Publication Data

US 2016/0306059 A1 Oct. 20, 2016

Related U.S. Application Data

(60) Provisional application No. 62/149,730, filed on Apr. 20, 2015.

(51) Int. Cl.
*G01V 1/38* (2006.01)
*B63B 21/66* (2006.01)

(52) U.S. Cl.
CPC .......... *G01V 1/3817* (2013.01); *G01V 1/3843* (2013.01); *B63B 21/66* (2013.01); *G01V 1/3808* (2013.01); *G01V 1/3835* (2013.01)

(58) Field of Classification Search
CPC ... G01V 1/3808; G01V 1/3817; G01V 1/3835
USPC ........................................................ 367/15
See application file for complete search history.

(56) References Cited

U.S. PATENT DOCUMENTS

| 6,691,038 B2 | 2/2004 | Zajac |
| 7,203,130 B1 | 4/2007 | Welker |
| 9,366,774 B2 * | 6/2016 | Welker ................ G01V 1/38 |
| 2008/0253225 A1 | 10/2008 | Welker et al. |
| 2008/0279042 A1 | 11/2008 | Storteig |
| 2015/0098303 A1 * | 4/2015 | Roger ............... G01V 1/3826 367/17 |
| 2016/0282495 A1 * | 9/2016 | Josse ................ G01V 1/3843 |

FOREIGN PATENT DOCUMENTS

EP  2360496  8/2001

OTHER PUBLICATIONS

European Search Report for EP Application No. 16165792.0-1559, dated Sep. 6, 2016.

* cited by examiner

*Primary Examiner* — Ian J Lobo

(57) ABSTRACT

Methods and related systems are disclosed. In an embodiment, a method includes determining a distance between a tow vessel and a predetermined point along a line being towed by the tow vessel. In addition, the method includes adjusting a length of the line from the tow vessel. Further, the method includes determining a change in the distance a predetermined amount of time after adjusting the length of the line. Still further, the method includes determining whether a difference between the change in the distance and the adjustment of the length exceeds a threshold value.

43 Claims, 7 Drawing Sheets

SYSTEMS AND METHODS FOR SENSOR STREAMER TANGLE DETECTION

CROSS-REFERENCE TO RELATED APPLICATIONS

This application claims the benefit of U.S. Provisional Application Ser. No. 62/149,730 filed Apr. 20, 2015 and titled "Alert for Repositioning a Streamer". The provisional application (i.e., U.S. Provisional Application Ser. No. 62/149,730) is incorporated by reference herein as if reproduced in full below.

BACKGROUND

Marine geophysical survey systems are used to acquire data regarding Earth formations below a body of water such as a lake or ocean. Some equipment utilized for marine surveying, such as streamers, may become tangled during repositioning (i.e., deployment and/or recovery operations). Tangles typically result from collision of one sensor streamer with another or with one or more sensor streamers and another piece of equipment (e.g., the seismic source, buoys, etc.). Addressing tangles of the sensor streamers is time consuming and therefore costly. As a result, the occurrence of such tangles greatly increases the costs of performing such marine geophysical surveying operations.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Cable" shall mean a flexible, load carrying member that also comprises electrical conductors and/or optical conductors for carrying electrical power and/or signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

DETAILED DESCRIPTION

The following discussion is directed to various embodiments. Although one or more of these embodiments may be preferred, the embodiments disclosed should not be interpreted, or otherwise used, as limiting the scope of the disclosure or the claims. In addition, one skilled in the art will understand that the following description has broad application, and the discussion of any embodiment is meant only to be exemplary of that embodiment, and not intended to intimate that the scope of the disclosure or the claims, is limited to that embodiment.

As previously described, the untangling of a sensor streamer during marine survey operations is a time consuming and therefore costly process. Often, the initial occurrence of such tangles are not noticed by personnel carrying out the survey due at least in part to the fact that the fully deployed sensor streamer can extend up to eight (8) nautical miles (14.8 km) or more. As a result, systems and methods for identifying tangles early in their formation would be greatly received in order to reduce the time necessary to correct them, and thereby reduce the time and costs associated with marine survey operations. Accordingly, embodiments disclosed herein provide systems and methods for detecting tangles in sensor streamers (and other towed equipment) being deployed or retracted from a tow vessel during marine geophysical surveys.

Figure 1:
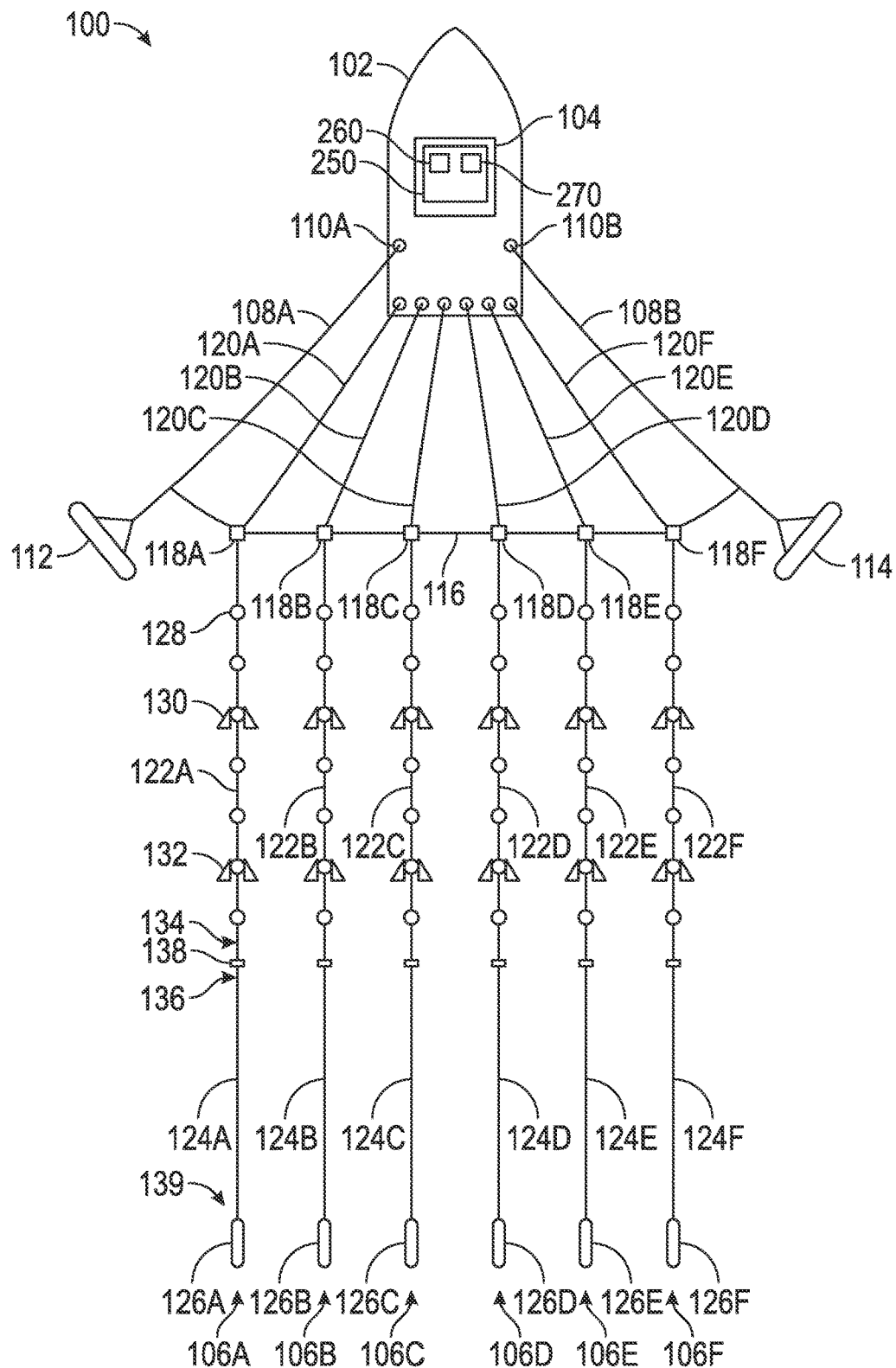
FIG. 1 shows an overhead view of a marine survey system in accordance with at least some embodiments.

FIG. 1 shows an overhead view of a marine survey system 100 in accordance with at least some embodiments. In particular, FIG. 1 shows a tow or survey vessel 102 having onboard equipment 104, such as navigation, energy source control, data recording, winch control, and processing equipment. Survey vessel 102 is configured to tow one or more sensor streamers 106A-F through the water. While FIG. 1 illustratively shows six sensor streamers, any number of sensor streamers may be used.

In this embodiment, the sensor streamers 106A-F are coupled to towing equipment that maintains the sensor streamers 106A-F at selected lateral positions with respect to each other and with respect to the survey vessel 102. The towing equipment may comprise two paravane tow lines 108A and 108B each coupled to the vessel 102 by way of winches 110A and 110B, respectively. The second end of paravane tow line 108A is coupled to a paravane 112, and the second end of paravane tow line 108B is coupled to paravane 114. The paravanes 112 and 114 are configured to provide a lateral force component to the various elements of the survey system when the paravanes are towed in the water. The combined lateral forces of the paravanes 112 and 114 separate the paravanes from each other until the paravanes put one or more spreader lines 116, coupled between the paravanes 112 and 114, into tension.

The sensor streamers 106A-F are each coupled, at the ends nearest the survey vessel 102 (i.e., the "proximal" or "forward" ends) to a respective lead-in cable termination 118A-F. The lead-in cable terminations 118A-F are coupled to or associated with the spreader lines 116 so as to control the lateral positions of the sensor streamers 106A-F with respect to each other and with respect to the vessel 102. Electrical and/or optical connections between the appropriate components in the onboard equipment 104 and the sensors in the sensor streamers 106A-F (e.g., sensor 128 in sensor streamer 106A, discussed more below) may be made using inner lead-in cables 120A-F, respectively.

Each sensor streamer 106A-F can be conceptually divided into an active section, a tail section, and a tail buoy. Thus, the sensor streamers 106A-F comprise active sections 122A-F, tail sections 124A-F, and tail buoys 126A-F. Referring to sensor streamer 106A as representative of all the sensor streamers 106A-F, active section 122A comprises a plurality of sensors (e.g., sensor 128) spaced along the active section 122A. Each example sensor 128 may be a seismic sensor (e.g., hydrophones, geophones), an electromagnetic sensor, or groups of seismic and electromagnetic sensors.

In order to control depth of the active sections, and in some cases to control lateral spacing between the sensor streamers, the active section of each sensor streamer may be associated with a plurality of streamer position devices periodically spaced along the active section. Again referring to sensor streamer 106A as representative, the active section 122A of sensor streamer 106A may be associated with streamer position device 130 coupled near the proximal end of the active section 122A. In many cases, the streamer position device 130 may provide only depth control, as the lateral spacing of the sensor streamers near the proximal ends may be adequately controlled by the spreader cable 116. Further, representative active section 122A of sensor streamer 106A may be associated with streamer position device 132, shown coupled further from the proximal ends near the distal end of the active section 122A. The streamer position device 132 may provide not only depth control, but also lateral positional control. While FIG. 1 shows only two of streamer position devices 130 and 132 associated with active section 122A of sensor streamer 106, in practice each active section may have many streamer position devices periodically spaced along the entire length of the active section (e.g., every 20-30 or more meters). In some examples, the streamer position devices (e.g., streamer position devices 130, 132) may be inline units that are built in to the sensor streamers (e.g., sensor streamers 106A-F).

The active sections 122A-F may be referred to as "active" because during a geophysical survey the sensors (e.g., sensor 128 associated with active section 122A) may be used to gather data (e.g., seismic readings, electromagnetic readings), and more particularly during towing of the sensor streamers 106A-F. In practice, each active section 122A-F may be made of a plurality of active segments coupled end-to-end by way of couplers. The active segments that make up the active sections 122A-F, as well as the couplers within the active sections 122A-F, are not explicitly shown so as not to unduly complicate the figure. Further in practice, the lengths of the active sections 122A-F may be from a few thousand meters to 10,000 meters or more.

The sensor streamers 106A-F are also associated with tail sections 124A-F, respectively. Again referring to sensor streamer 106A as representative, the active section 122A defines a distal end 134. The proximal end 136 of tail section 124A couples to the distal end 134 of active section 122A, such as by way of couplers 138. Representative tail section 124A also defines a distal end 139, to which tail buoy 126A is coupled. Representative tail section 124A thus couples the distal end 134 of the active section 122A to the tail buoy 126A. The tail section 124A and tail buoy 126A may serve many functions, such as marking the end of the sensor streamer in the water, providing support for the distal end 134 of the active section 122A, and in some cases the tail buoy 126A may have steering capabilities (which steering capabilities may help placement of the active section 122A).

In various embodiments, the tail sections 124A-F do not contain sensors, or if sensors are present in the tail sections 124A-F, the sensors are not used to collect geophysical survey data. In some cases, a tail section (e.g., sections 124A-F) may be one or more segments of a sensor streamer previously used as active segments, but where the sensors are broken, unusable, or unreliable. Thus, sometimes the tail sections are referred to as "dead sections".

During deployment or retraction of the sensor streamers 106A-F, onboard equipment 104 monitors for tangles of the sensor streamers 106A-F by measuring and comparing various distances along the sensor streamers 106A-F. Specifically, as one or more of the sensor streamers 106A-F are deployed from or retracted toward vessel 102, a control system 250, included within onboard equipment 104 and described below, monitors the movement of a reference point along the deployed/retracted sensor streamer relative to vessel 102 and compares that distance over time to the amount of length to the sensor streamer that is deployed or retracted from vessel 102 to determine whether the sensor streamer has likely become tangled with another piece of equipment associated with system (e.g., another sensor streamer 106A-F, tail buoy 126A-F, etc.), debris, or some other object. It should be appreciated that these procedures (including those described in more detail below) may be carried out during the deployment of a single sensor streamer (e.g., one of the sensor streamers 106A-F) or during the simultaneous deployment of multiple sensor streamers (e.g., two, three, four, or more of the sensor streamers 106A-F). To more fully explain the disclosed system, reference will be made to a simplified version of the marine survey system 100; however, the principles discussed herein can be readily applied within the system 100 as shown in FIG. 1.

In particular, reference will now be made to FIGS. 2 and 3, where a simplified marine survey system 200 including a pair of sensor streamers 206A, 206B deployed from the vessel 102 (previously described) is shown. Sensor streamers 206A, 206B are substantially the same as sensor streamers 106A-F, previously described, except that sensor streamers 206A, 206B are shown in a simplified manner, with many of the other features of sensor streamers 106A-F not specifically depicted so as not to unduly complicate the figures. As shown, each sensor streamer 206A, 206B includes a distal end 239 that is coupled to a respective tail buoy 226A, 226B, each of which being the same as tail buoys 126A-F previously described above. The proximal end of each sensor streamer 206A, 206B is coupled to vessel 102 at a winch or reel 210A, 210B, respectively. During deployment operations, sensor streamers 206A, 206B are controllably paid out from winches 210A, 210B. Conversely, during retraction operations, sensor streamers 206A, 206B are controllably paid in (or retracted) onto winches 210A, 210B.

Figure 2:
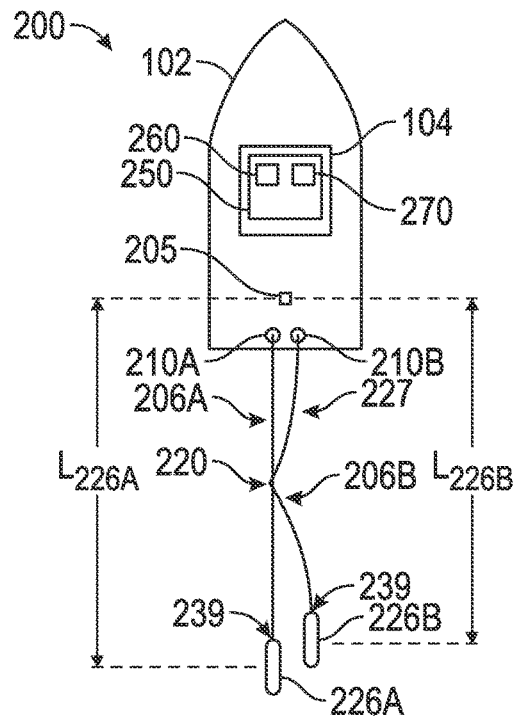
FIGS. 2 and 3 show overhead views of another marine survey system in accordance with at least some embodiments.
Figure 3:
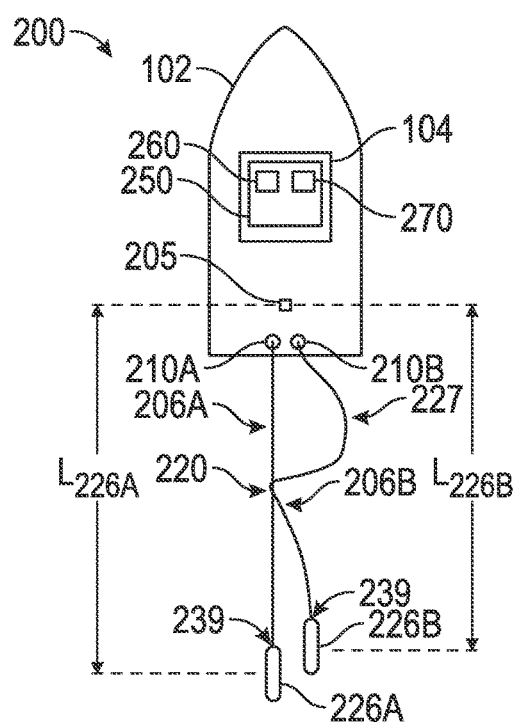

As is also shown in FIGS. 2 and 3, control system 250 in onboard equipment 104 further includes a navigation system 260, and a winch control system 270. Navigation system 260 measures the distance between vessel 102 (or some reference point thereon) and a predetermined point along sensor streamers 206A, 206B. In at least some embodiments, the predetermined point along sensor streamers 206A, 206B is on the tail buoys 226A, 226B, respectively. However, it should be fully appreciated that the navigation system 260 may also or alternatively measure the distance between reference point 205 on vessel 102 and any other suitable location along sensor streamers 206A, 206B such as, for example, a sensor or node disposed along sensor streamers 206A, 206B. In addition, in some embodiments, navigation system 260 may measure the relative distances between sensors disposed on the sensor streamers 206A, 206B themselves (e.g., internal navigation sensors). Nevertheless, for ease of explanation in the discussion below, the distance between the vessel 102 and the predetermined point along the sensor streamers 206A, 206B will be exclusively characterized as a distance between the tail buoys 226A, 226B and a predetermined reference point 205 on vessel 102. As shown in FIGS. 2 and 3, the distance between reference point 205 on vessel 102 and tail buoy 226A is represented by length $L_{226A}$ and the distance between reference point 205 on vessel 102 and tail buoy 226B is represented by the length $L_{226B}$.

In this embodiment, navigation system 260 is able to determine or measure the distances $L_{226A}$, $L_{226B}$ with data received from a Global Positioning System (GPS) device disposed on tail buoys 226A, 226B, vessel 102 and/or some other location. However, it should be appreciated that any suitable system or method for determining the distance between reference point 205 on vessel 102 and buoys 226A, 226B may be utilized, such as, for example lasers (or other light beams), acoustic pinging, or inertial systems utilizing gyroscopes (e.g., such as those used for satellite and/or submarine navigation).

Referring still to FIGS. 2 and 3, winch control system 270 monitors the amount or length of sensor streamers 206A, 206B that is being paid out from or paid in to winches 210A, 210B over time. For example, winch control system 270 may monitor the revolutions of winches 210A, 210B and therefrom determine the amount of sensor streamers 206A, 206B that have been deployed from vessel 102. As another example, winch control system 270 may communicate with identification tags (e.g., radio frequency identification or RFID tags) that are disposed along sensor streamers 206A, 206B, and therefrom determine the amount of sensor streamers 206A, 206B that have been deployed from vessel 102. Further, winch control system 270 may also control the deployment or retraction of sensor streamers 206A, 206B from or onto winches 210A, 210B, respectively. Specifically, winch control system 270 may control the payout or pay in speed of winches 210A, 210B, and may start and stop winching operations 210A, 210B altogether.

During deployment operations, it should be expected that an increase in the length of sensor streamers 206A, 206B from winches 210A, 210B, respectively, should eventually coincide with a similar or equivalent increase in the distances $L_{226A}$, $L_{226B}$, respectively. Conversely, during retraction operations, it should be expected that a decrease in the length of sensor streamers 206A, 206B toward winches 210A, 210B should eventually coincide with a similar or equivalent decrease in the distances $L_{226A}$, $L_{226B}$, respectively. However, if a tangle occurs along any one or both of the sensor streamers 206A, 206B during deployment or retraction of sensor streamers 206A, 206B, the change in distances $L_{226A}$, $L_{226B}$ will not correspond with the rate of payout or pay in of sensor streamers 206A, 206B from winches 210A, 210B, respectively.

For example, in the embodiment of FIG. 2, sensor streamer 206B is shown tangled with sensor streamer 206A at a location or point 220 during a deployment operation (e.g., where sensor streamer 206B is being paid out from winch 210B). Following formation of the tangle at point 220, further deployment or payout of sensor streamer 206B from winch 210B will not result in a significant (or any) increase in the distance $L_{226B}$. Specifically, as shown in FIG. 3, once sensor streamers 206A, 206B become tangled at point 220, additional length of sensor streamer 206B that is paid out from winch 210B forms an ever enlarging loop 227 between vessel 102 and point 220. As loop 227 enlarges further, the risk of further tangling with adjacent sensor streamers (e.g., sensor streamer 206A) increases. As a result, if the tangle at point 220 is not detected and corrected early, the problem may exacerbate itself.

To mitigate these issues, control system 250 monitors the distance of a defined reference point on sensor streamers 206A, 206B (in this case, the tail buoys 226A, 226B) relative to vessel 102 (e.g., distances $L_{226A}$, $L_{226B}$) as measured by the navigation system 260 and compares that changing distance to the amount of sensor streamers 206A, 206B that are being paid out or paid in from winches 210A, 210B as determined by the winch control system 270. In general terms, if the change in the distances $L_{226A}$, $L_{226B}$ does not sufficiently correspond with the payout or pay in distance of the sensor streamers 206A, 206B, the control system 250 can determine that one of more of the sensor streamers 206A, 206B has become tangled and can alert personnel accordingly.

Stated more particularly and still referring to FIGS. 2 and 3, during a deployment or retraction of sensor streamer 206B, control system 250 first directs navigation system 260 to take a measurement of the distance $L_{226B}$. Thereafter, control system 250 directs winch control system 270 to deploy or retract some amount of length of sensor streamer 206B. The amount of sensor streamer 206B that is deployed or retracted is known and stored by control system 250. Next, the control system 250 takes a subsequent measurement of the distance $L_{226B}$ (via navigation system 260) and computes a delta or difference of the length $L_{226B}$ since the previous measurement. This delta in the distance $L_{226B}$ is then compared against the known deployment or retracted length of the sensor streamer 206B to see if the difference between the change in distance $L_{226B}$ and the deployed or retracted length is within a predetermined threshold. In other words, if the change in the distance $L_{226B}$ is represented by the variable $\Delta L_{226B}$, and the payout or pay in length of the sensor streamer 206B is represented by the variable X, then the determination discussed above would be represented mathematically in the following inequality:

$$|X - \Delta L_{226B}| > \text{THRESHOLD} \quad \quad \quad \text{(Eq. 1)}.$$

If the inequality of Equation 1 above is satisfied (i.e., the difference between $\Delta L_{226B}$ and X is greater than some threshold value), then control system 250 determines that a tangle has likely occurred along sensor streamer 206B. After such a determination, control system 250 may activate an alarm of some sort to alert personnel to the likelihood of the tangle. If, on the other hand, the inequality of Equation 1 is not satisfied (i.e., the difference between $\Delta L_{226B}$ and X is not greater than some threshold value), then control system 250 continues with normal operations (e.g., payout or pay in of the sensor streamer 206B as appropriate). It should be appreciated however that the calculation shown in Equation 1 above is merely an example of the potential calculation that may be carried out in these embodiments, and is in no way limiting of the other potential mathematical and/or logical expressions that may be used to determine that a tangle has occurred along one or more of the sensor streamers (e.g., sensors streamers 206A, 206B). For example, in other embodiments, the change in position of an adjacent tail buoy (e.g., tail buoy 226A) may also be compared to the change in position of the tail buoy in question (e.g., tail buoy 226B) to better inform the analysis described herein.

Determination of the threshold in Equation 1 above is based on various factors, including, for example, the shape or curvature of the sensor streamer (e.g., curvature induced by current, a vessel heading change, etc.) (see FIG. 5 and associated discussion below), the amount of current exerted on the sensor streamer, and the depth of the sensor streamer (e.g., depth D shown in FIG. 4). For example, in at least some embodiments it should be expected that a payout or retraction of the sensor streamers 206A, 206B should cause a nearly equivalent movement of tail buoys 226A, 226B, respectively (or some other point of reference along sensor streamers 206A, 206B, respectively) and thus a nearly equivalent increase in the distances $L_{226A}$, $L_{226B}$, respectively. Specifically, in some embodiments, it should be expected that a payout or retraction of the sensor streamer 206A would result in a change in the distance between the tail buoy 226A and the vessel 102 (or more specifically reference point 205) that is 90% or greater of the payout or pay in length. Thus, in at least some embodiments, the threshold value for the difference between the change in the distance between the tail buoy (e.g., tail buoys 226A, 226B) and vessel 102 (e.g., distances $L_{226A}$, $L_{226B}$) and the deployed or retracted length of the sensor streamer (e.g., 206A, 206B, etc.) is set to be 10% or less of the deployed or retracted length of the sensor streamer. In other embodiments, the threshold value is set to be 5% or less deployed or retracted length of the sensor streamer, and in still other embodiments, the threshold value is set to be 3% or less deployed or retracted length of the sensor streamer.

In addition, during these deployment or retraction operations of sensor streamers 206A, 206B, the tail buoys 226A, 226B, respectively, will not immediately move in response to a payout or pay in of sensor streamers 206A, 206B from winches 210A, 210B, respectively. Specifically, various system and environmental factors cause a time lag to occur between a payout/pay in of the sensor streamers 206A, 206B and a corresponding movement of the tail buoys 226A, 226B, respectively. For example, these various system and environment factors may include, but are not limited to, the total deployed length of the sensor streamer (e.g., sensor streamers 206A, 206B), the amount of tension in the sensor streamer, the amount (or strength) of water currents being experienced by the sensor streamer and/or tail buoy, the rate of deployment or retraction of the sensor streamer, the speed of the tow vessel, and any changes in heading or direction (i.e., turns) taken by the tow vessel. The effects of each of these factors on the amount of time lag between a payout or pay in of the sensor streamer (e.g., sensor streamers 206A, 206B) and a corresponding movement of the tail buoy will now be discussed below.

Figure 4:
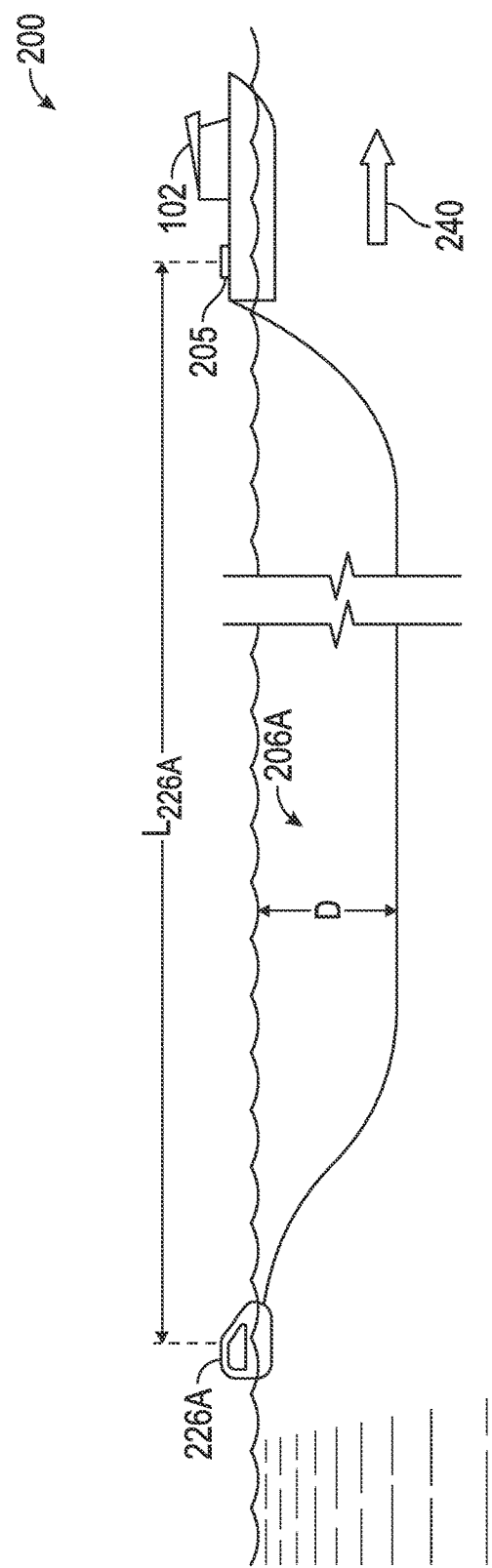
FIG. 4 shows a side view of the marine survey system of FIGS. 2 and 3 in accordance with at least some embodiments.

Referring now to FIG. 4 which shows a side view of marine survey system 200. Only sensor streamer 206A is shown in FIG. 4 so as not to unduly complicate the figure. As shown, when sensor streamer 206A is deployed from vessel 102, at least a portion of sensor streamer 206A sinks below the surface of the water to a depth D. In this embodiment, tail buoy 226A is a buoyant member and thus is disposed at the sea surface. Accordingly, sensor streamer 206A is generally U-shaped in side view as shown in FIG. 4, with the lowest portion of the disposed at the depth D. As a result, as the depth D increases, the time lag between a deployment or retraction of the sensor streamer 206A at vessel 102 and a corresponding movement of the tail buoy 226A may also increase.

In addition, as the tension in the sensor streamer 206A decreases, such as, for example, if the deployment or retraction speed of the sensor streamer 206A does not sufficiently match the speed of the vessel 102, one would expect the time lag between deployment/retraction of the sensor streamer 206A and the corresponding movement of the tail buoy 226A to increase. For example, during a sensor streamer deployment operation, if the speed of the vessel 102 is not sufficiently higher than the payout rate of the sensor streamer 206A, the tension in the sensor streamer 206A will decrease, thereby leading to bunching or a collection of the sensor streamer 206A between the stern of the vessel 102 and the tail buoy 226A and/or an increased depth D of the sensor streamer 206A within the water. As a result, one would expect that the time lag between a deployment of the sensor streamer 206A and a corresponding movement of the tail buoy 226A would increase. As another example, as the overall length of the deployed sensor streamer 206A increases, the amount of tension in streamer 206A tends to increase (e.g., due at least in part to increase resistance on the sensor streamer 206A from the water). Therefore, as the length of the sensor streamer decreases, one might expect a mismatch in the vessel 102 speed and deployment/retraction speeds of the sensor streamer 206A to have a greater effect on the time lag of movement for the tail buoy 226A.

Figure 5:
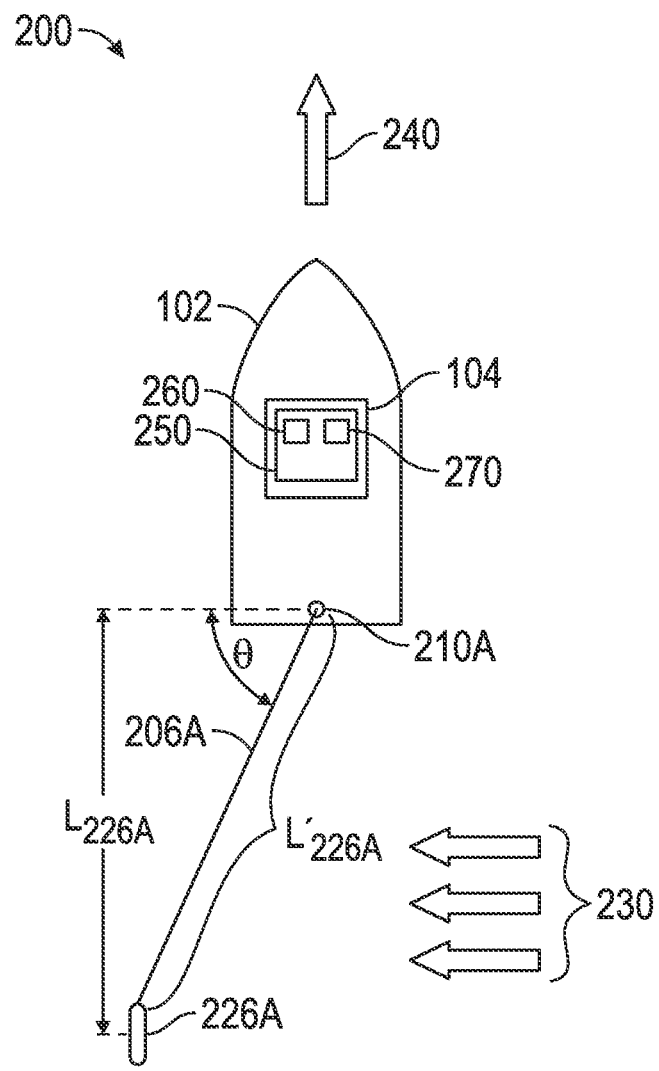
FIG. 5 shows an overhead view of the marine survey system of FIGS. 2 and 3 with a sensor streamer that is laterally biased by a water current in accordance with at least some embodiments.

Referring now to FIG. 5, which shows a top view of marine survey system 200. As with FIG. 4, only sensor streamer 206A is shown in FIG. 5 so as not to unduly complicate the figure. As is shown in FIG. 5, as sensor streamer 206A is towed behind vessel 102, a current 230 running at least partially transverse to the direction of motion 240 of the vessel 102 will result in a lateral biasing of the sensor streamer 206A which causes sensor streamer 206A to take on a curved shape extending between vessel 102 and tail buoy 226A when viewed from above (note: FIG. 5 shows sensor streamer 206A in a relatively straight line so as not to unduly complicate the figure; however, one of ordinary skill will appreciate that sensor streamer 206A will typically include at least some non-linear curvature resulting from a lateral biasing of the tail buoy 226A). As the strength of current 230 increases, the amount or severity of the curvature in sensor streamer 206A also increases which thereby also causes the time lag between a deployment/retraction of the sensor streamer 206A and a corresponding movement of the tail buoy 226A to increase. In addition, it should be appreciated that a lateral biasing of the tail buoy 226A and thus curvature of the sensor streamer 206A may result from a turn or change in heading of vessel 102 (e.g., a turn or change in heading to maintain vessel 102 within the desired prospecting area).

Moreover, still referring to FIG. 5, a lateral bias in the tail buoy (e.g., tail buoy 226A) and the resulting curvature of the sensor streamer (e.g., sensor streamer 206A) can also create non-trivial differences between the linear distance between the vessel 102 and the tail buoy 226A and the actual deployed length of the sensor streamer 206A. For example, if the tail buoy 226A is biased laterally by current 230 such that streamer 206A generally forms an angle θ that is approximately equal to 45°, then a deployment of approximately 8 km of sensor streamer 206A (shown in FIG. 5 as length $L'_{226A}$) will only result in approximately 7.2 km in actual linear distance $L_{226A}$ between vessel 102 and tail buoy 226A. This resulting difference in lengths $L'_{226A}$ and $L_{226A}$ may be accounted for by control system 250 by, for example, adjusting the threshold value from Equation 1 as previously described.

Therefore, referring back now to FIGS. 2 and 3, during a deployment or retraction operation for sensor streamers 206A, 206B, control system 250 applies a time lag or waiting period (i.e., a predetermined amount of time) between a payout or pay in of the sensor streamers 206A, 206B and a measurement of the change in the distances $L_{226A}$, $L_{226B}$ of tail buoys 226A, 226B, respectively, in order to account for the time lag which should occur for such tail buoy movements as a result of the system and environmental factors discussed above. For example, control system 250 may increase the waiting period if the tension in the sensor streamer decreases (e.g., below some predefined minimum value). As another example, the control system 250 may adjust the waiting period if there is a mismatch in the speed of vessel 102 and the payout or pay in rate of the sensor streamer (e.g., sensor streamers 206A, 206B). Specifically, if the speed of vessel 102 is much lower than the payout rate of the sensor streamer (thereby causing the tension in the sensor streamer to decrease) then control system 250 may increase the waiting period accordingly. The waiting period imposed by control system 250 may be calculated before beginning a sensor streamer deployment or retraction operation, or it may be empirically determined by monitoring the actual delay in the tail buoy (e.g., buoys 226A, 226B) movement corresponding to a payout or pay in of the sensor streamer at vessel 102 (e.g., at the beginning of deployment or retraction of the sensor streamer).

It should be appreciated that the above described monitoring and analysis performed by control unit 250 as well as the payout or pay in of the sensor streamer (e.g., sensor streamer 206A, 206B) may occur on a continuous basis (although such continuous operation is not required). For example, in some embodiments, during a deployment or retraction operation for sensor streamer 206B, sensor streamer 206B is continuously paid out from winch 210B. During this payout, control unit 250 continuously takes both measurements of the distance $L_{226B}$ via navigation system 260 and measurements of the length of sensor streamer 206B paid out from or paid in to winch 210B, via winch control system 270. In addition, control unit 250 continuously compares (e.g., per Equation 1 as described above) each payout or pay in length measurement to a change in the distance $L_{226B}$ that was measured a predetermined amount of time after the payout or pay in to account for any lag in movement of the tail buoy 226B as described above.

Referring still to FIGS. 2 and 3, in at least some embodiments, control system 250 may cease or refrain from any of the tangle monitoring operations or methods described herein if tail buoys 226A, 226B are within a predetermined distance of vessel 102. In other words, in some embodiments, control system 250 may cease or refrain from any tangle monitoring operations if one of both of the distances $L_{226A}$, $L_{226B}$ is below a preset value. For example, in one specific embodiment, if one or both of the distances $L_{226A}$, $L_{226B}$ is less than 500 meters, control system 250 stops or refrains from engaging in the analysis above for determining if a tangle is occurring along any one or both of the sensor streamers 206A, 206B. Without being limited to this or any other theory, when tail buoys 226A, 226B are within a relatively close distance to vessel 102, the likelihood of a tangle is much reduced. In addition, when tail buoys 226A, 226B are within a relatively close distance to vessel 102, operation of winches 210A, 210B can often be better controlled and monitored by personnel on vessel 102.

In addition, it should also be appreciated that in some embodiments, control system 250 is configured to monitor the distance between the vessel 102 and a plurality of defined reference points distributed along sensor streamers 206A, 206B via the navigation system 260 and compares those changing distances to the amount of sensor streamers 206A, 206B that have been paid out or paid in from winches 210A, 210B, in the same manner as described above. By monitoring a plurality of reference points along sensor streamers 206A, 206B, control system 250 may be able to determine which location or region (e.g., point 220) along streamers 206A, 206B has become tangled in order to more finely direct or advise subsequent remedial action(s).

Figure 6:
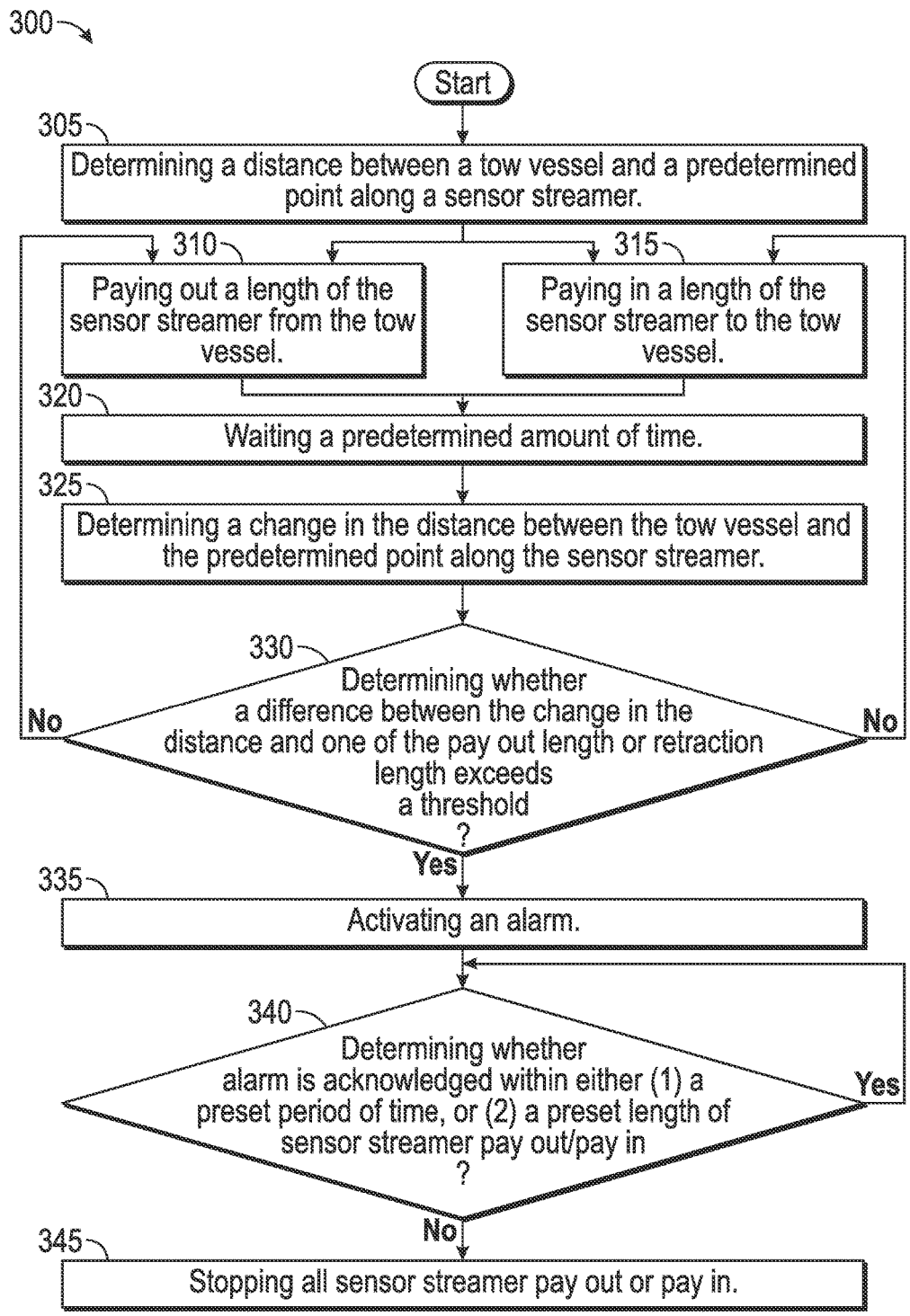
FIG. 6 shows a method in accordance with at least some embodiments.

Referring now to FIG. 6, where a method 300 in accordance with at least some embodiments is shown. In explaining method 300, reference will be made to marine survey system 200 shown in FIGS. 2-5; however, it should be appreciated that method 300 may be performed with any other suitable system other than those specifically shown and/or described herein. In particular, method 300 starts with and comprises determining a distance between a tow vessel (e.g., vessel 102 or a predetermined reference point 205 on vessel 102) and a pre-determined point along a sensor streamer (e.g., sensor streamers 206A, 206B) at block 305. As previously described, in at least some embodiments, the pre-determined point may be disposed on a tail buoy (e.g., tail buoys 226A, 226B, etc.), and thus, the distance described in block 305 may correspond to one or both of the distances $L_{226A}$, $L_{226B}$ shown in FIGS. 2 and 3. In addition, as previously described, there could be a plurality of predetermined points disposed along the sensor streamer in other embodiments.

Next, method 300 includes adjusting a length of the sensor streamer extending from the tow vessel. Specifically, method 300 includes one of paying out a length of sensor streamer from the tow vessel in block 310 or paying in a length of the sensor streamer to the tow vessel in block 315 (as used herein, both a pay out as in block 310 and a pay in as in block 315 are considered an adjustment in the length of the sensor streamer extending from the tow vessel). The choice between the payout in block 310 and the pay in or retraction in block 315 is dictated by whether a sensor streamer deployment or retraction operation is taking place. In either case, the amount or length of the sensor streamer that is paid out or paid in to vessel 102 is measured (e.g., via control system 250 via winch control system 270) for further analysis as described below.

Following the measurement of the distance between the vessel 102 (or more specifically point 205) and the tail buoy (e.g., tail buoy 226B) in block 305 and the payout or pay in length of the sensor streamer (e.g., sensor streamers 206A, 206B) in blocks 310, 315, respectively, method 300 includes waiting a predetermined period of time in block 320. As previously described, during deployment or retraction operations, one of ordinary skill would not expect a payout or pay in of the sensor streamer to immediately result in a corresponding movement of the tail buoy (or another point of reference along the sensor streamer) relative to the tow vessel due to the various system and environmental factors discussed above. As a result, block 320 includes waiting a predetermined amount of time to account for this expected time lag between a deployment or retraction of the sensor streamer (e.g., sensor streamers 206A, 206B) and a corresponding movement of the predetermined point along the sensor streamer (e.g., tail buoys 226A, 226B). As previously described, the predetermined amount of time may be determined based on, for example, the total length of the sensor streamer deployed from the tow vessel, the amount of tension in the sensor streamer, the amount of current (e.g., transverse current 230) experienced by the sensor streamer, a change in heading (i.e., a turn) by the vessel 102, the payout or pay in rate of the sensor streamer, the speed of the vessel 102, or combinations thereof. In some embodiments, the predetermined amount of time ranges from 10 seconds to 2 minutes, inclusive; however, other times are possible.

Referring still to FIG. 6, method 300 next includes determining a change in the distance between the tow vessel (e.g., vessel 102 or reference point 205 on vessel 102) and the predetermined point along the sensor streamer in block 325 (e.g., a change in distance $L_{226A}$, $L_{226B}$). Thereafter, method 300 includes determining whether a difference between the change in the distance from block 320 and either the payout length in block 310 or the pay in length in block 315 exceeds a threshold in block 330. For example, block 320 includes determining whether the inequality of Equation 1 above is satisfied for the specific sensor streamer deployment/retraction operation taking place (note: while Equation 1 is specifically written to correspond to a deployment or retraction of the sensor streamer 206B shown in FIGS. 2 and 3, one of ordinary skill would fully understand and appreciate that Equation 1 could be readily adapted to correspond to a deployment or retraction of another sensor streamer, such as, sensor streamer 206A). If the difference between the change in the distance from block 320 and either the payout length in block 310 or the retraction length in block 315 is not greater than the threshold, the determination in block 330 is "no" and method 300 loops back to once again payout or pay in a length of the sensor streamer in block 310 or 315, respectively. The threshold value may be determined in the same manner as described above with regard to Equation 1.

If, on the other hand, the difference between the change in the distance from block 320 and either the payout length in block 310 or the retraction length in block 315 is greater than the threshold value, the determination in block 330 is "yes" and an alarm is activated in block 335 indicating that the sensor streamer is likely tangled at some point. Thereafter, block 340 includes a determination as to whether the alarm activated in block 335 has been acknowledged by personnel with either (1) a preset period of time, or (2) a preset length of sensor streamer payout/retraction. The alarm may be acknowledged in any suitable fashion by personnel, such as, for example, pushing a button, and/or inputting some specific information (e.g., code, password, etc.). If the alarm is not acknowledged within either the preset time or the preset length of deployment/retraction of the sensor streamer, method 300 includes stopping all sensor streamer deployment or retraction in block 345. If, on the other hand, the alarm has been acknowledged within either the preset period of time or the preset length of sensor streamer payout/retraction, then the alarm continues or is disregarded by the onsite personnel and sensor streamer deployment or retraction operations may continue as appropriate.

Figure 7:
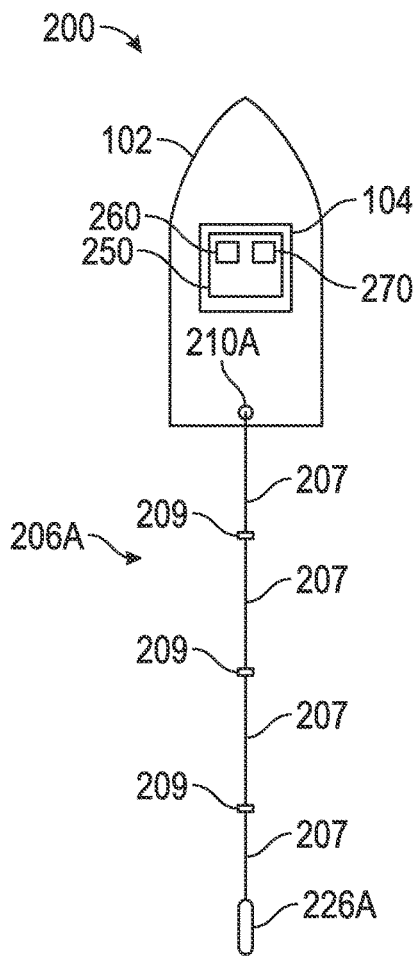
FIGS. 7 and 8 show overhead views of the marine survey system of FIGS. 2 and 3 undergoing a sensor segment replacement operation in accordance with at least some embodiments.
Figure 8:
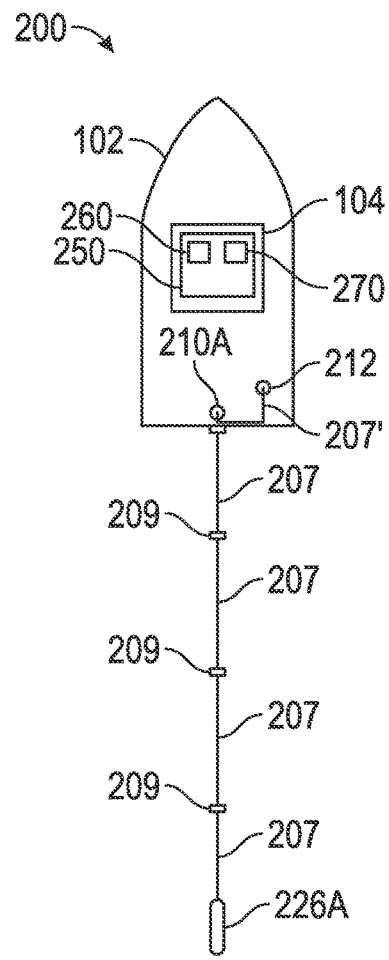

The preset period of time and/or the preset length of sensor streamer payout/retraction in block 340 may be set to account for other operations which may affect tail buoy movements caused by payout or retraction of the sensor streamer at the tow vessel such that these other operations will not necessarily cause an unwanted shutdown in the pay in or payout operation of the winch (e.g., per block 345). In particular, reference is now made to FIGS. 7 and 8 where marine survey system 200 is again shown with only sensor streamer 206A so as not to unduly complicate the figure. As shown and as previously mentioned above, in at least some embodiments, sensor streamer 206A comprises a plurality of discrete segments 207 which are coupled to one another with couplers 209. During deployment operations (i.e., as sensor streamer 206A is paid out from winch 210A), a particular segment 207 may need to be replaced (e.g., due to damage or a defect in the segment 207). Accordingly, to replace the damaged or defective segment 207, sensor streamer 206A is coupled to vessel 102 (e.g., at the stern) and winch 210A continues to payout the damaged segment 207' to another winch 212 (herein called a "take up winch") for storage. Once the damaged segment 207' is fully paid out from winch 210A and paid onto take up winch 212, the next segment 207 disposed on winch 210A is reconnected to the rest of sensor streamer 206A which is coupled to the stern of vessel 102 such that deployment operations may once again proceed as previously described.

As can be appreciated from the discussion above, during these sensor streamer segment removal or replacement operations, payout of the sensor streamer 206A from winch 210A continues while all extension or movement of the tail buoy 226A ceases (since the deployed portion of sensor streamer 206A is secured to the stern of vessel 102). As a result, during such operations, it will likely be determined that the difference between a change in the distance between the tail buoy 226A (which should be zero) and the payout or retraction amount of the sensor streamer 206A at winch 210A will be above the threshold value defined above (i.e., the determination in block 320 would be "yes"). In such a case, an alarm (e.g., the alarm in block 335) will be triggered. Therefore, referring back now to FIG. 6, in at least some embodiments, the method 300 allows for some period of time or winching length which will correspond to the segment change operation shown in FIGS. 7 and 8, to avoid unnecessarily stopping all payout or pay in of the sensor streamer at block 345. Specifically, in block 345, the preset period of time is set to the amount of time required to fully payout the damaged segment 207', and the preset length is the length of the segment 207'. In some embodiments, the preset length equals 50 meters, and in still other embodiments equals 75 meters; however, other lengths are possible.

Figure 9:
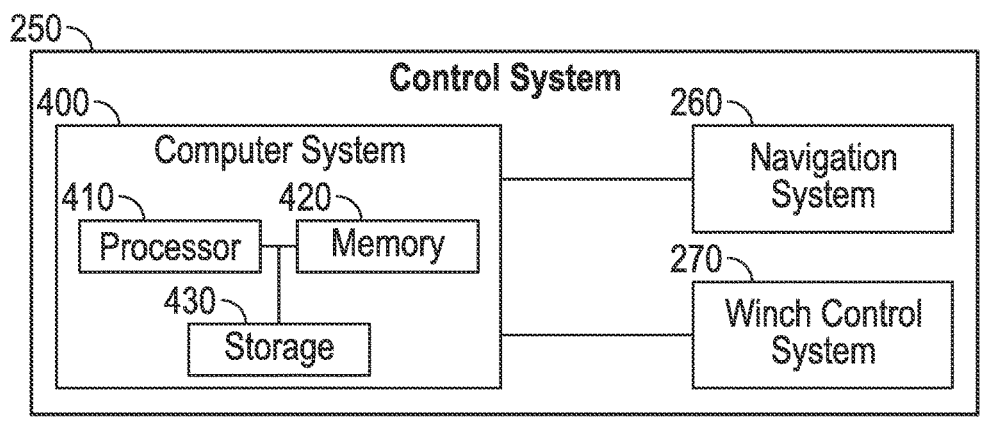
FIG. 9 shows a block diagram of a control system of a marine survey system in accordance with at least some embodiments.

Referring now to FIG. 9 where an example electrical system that may be implemented on vessel 102 is shown. In particular, FIG. 9 shows the control system 250 which is included in onboard equipment 104, and further includes navigation system 260 and winch control system 270, each as previously described above. The control system 250 may comprise a computer system 400 operatively coupled to navigation system 260 and winch control system 270.

The computer system 400 may comprise any suitable processor-based system that can be programmed to monitor the distance between vessel 102 (or reference point 205) and some reference point along the sensor streamers (e.g., streamers 206A, 206B, 106A-F, etc.), such as, for example, at the tail buoy (e.g., tail buoys 226A, 226B, 126A-F, etc.) via navigation system 260, and programmed to control the deployment and retraction of sensor streamers via winch control system 270. In the example system of FIG. 9, the computer system comprises a processor 410 coupled to a main memory 420, as well as a long term, non-volatile storage device 430 (hereafter just "storage device 430"). The processor 410 may be any currently available or after-developed processor configured to execute programs. The main memory 420 may be the working memory from which the processor 410 executes instructions, and the main memory 420 may be any of the various types of random access memory (RAM). In some example systems, the processor 410 and main memory 420 may be individual components operatively coupled together; however, in other systems the processor 410 and memory 420 may be an integrated unit, such as any currently available or after-developed microcontroller. The storage device 430 may be a long term storage device wherein instructions and data are held. In some cases, the storage device 430 may be a spinning disk hard drive or optical drive, and in other cases the storage device 430 may be solid state storage (e.g., an array of flash memory devices). Main memory 420 and/or storage device 430 may comprise a non-transitory computer readable medium.

During sensor streamer deployment or retraction operations of a sensor streamer (e.g., sensor streamers 206A, 206B), software saved on one or both of main memory 420 or storage 430 is executed by the processor 410 to monitor the distance between the vessel 102 (or reference point 205) and the tail buoy (e.g., tail buoys 226A, 226B) via the navigation system 260 and compare that distance to the amount of sensor streamer that is being deployed or retracted from or toward vessel 102 via the winch control system 270. Specifically, software saved on one or both of the main memory 420 or storage 430 is executed by the processor 410 to perform any and all of the tangle monitoring analysis and methods described herein.

While embodiments disclosed herein have concerned the monitoring for tangles along one or more sensor streamers (e.g., sensor streamers 206A, 206B) during a deployment or retraction operation, it should be understood that other embodiments may concern the monitoring of other types of towed equipment. For example, reference is now made to FIG. 10, where a marine survey system 500 is shown. System 500 includes vessel 102 with onboard equipment 104, both being as previously described above. In addition, system 500 includes a seismic source 520 towed behind vessel 102 with a tow line 530. System 500 may also include one or more sensor streamers that are configured the same as any one or more of the sensor streamers 106A-F, 206A, 206B, previously described; however, the sensor streamers of system 500 are not shown in FIG. 10 so as not to unduly complicate the figure. During seismic survey operations, seismic source 520 emits waves of energy (e.g., acoustic, electromagnetic, etc.) which are reflected off of a subterranean formation and detected by sensing elements in the sensor streamers (not shown).

During these operations, source 520 may become tangled with other equipment (e.g., sensor streamers, tail buoys, etc.), debris, or other objects. Such tangling can cause the source 520 to be moved or kept out of proper positioning relative to vessel 102 and the other sensor streamers, and thereby threatens the operability of system 500 as a whole. As a result, in this embodiment, control system 250, being the same as previously described above, is configured to monitor the position of source 520 and determine that a tangle of either source 520 and/or line 530 has likely occurred if source 520 is determined to be out of the expected and proper position. Specifically, in this embodiment, navigation system 260 is configured to measure or monitor the position of source 520 relative to vessel 102 in substantially the same manner as described above for the measurement of distances $L_{226A}$, $L_{226B}$ between vessel 102 and tail buoys 226A, 226B, respectively (See FIGS. 2 and 3). For example, navigation system 260 may monitor the position of source 520 with a GPS or other suitable measurement system. If source 520 falls outside of an expected or acceptable range of locations relative to vessel, an alarm is triggered (e.g., similar to the alarm discussed above in block 335 of method 300) thereby alerting personnel to the likelihood of a tangle on source 520 or line 530.

Figure 10:
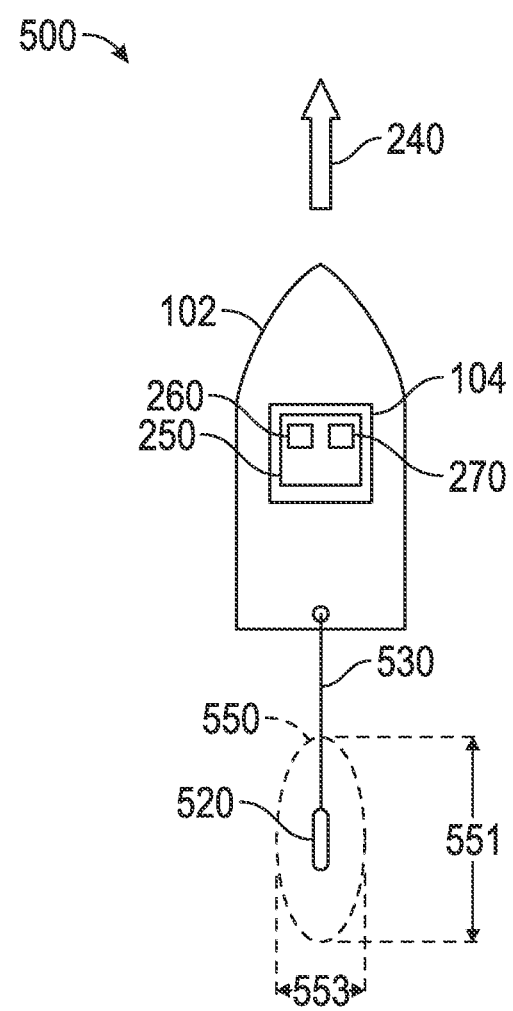
FIG. 10 shows an overhead view of the marine survey system of FIGS. 2 and 3 towing a seismic source in accordance with at least some embodiments.

In one embodiment, control system 250 causes navigation system 260 to take a measurement of the position of source 520 at a predetermined time (e.g., every 15, 30, or 45 seconds or even every 1, 5, 10, 30, or 60 minutes, etc.) and determines whether source 520 is disposed within a desired zone or envelope 550. In at least some embodiments, as shown in FIG. 10, the zone or envelope 550 comprises an oval with a major dimension 551 substantially aligned with the direction of travel 240 of vessel 102 and a minor dimension 553 extending substantially transverse to the direction of travel 240 of vessel 102. Accordingly, during survey operations, control system 250 periodically checks, via navigation system 260, whether source 520 is disposed within envelope 550. If, at some point, source 520 is determined to be outside of envelope 550, control system 250 determines that a tangle of source 520 and/or line 530 is likely and activates an alarm accordingly. In at least some embodiments, envelope 550 also extends beneath the surface of the water such that the range of desired positions of the source 520 also includes a range of desired depths relative to the water surface.

Referring again to FIG. 1, as previously described, marine survey system 100 (and also systems 200 and 500) may include a plurality of streamer position devices 130, 132 disposed on the sensor streamers 106A-F. In addition, in embodiments disclosed herein, control system 250 may monitor the retraction or deployment length of each sensor streamer 106A-F via winch control system 270 and determine when an installation location for a streamer position device 130, 132 is at or near the deployment/retraction winch on vessel 102 (e.g., winches 210A, 210B shown in FIGS. 2 and 3). In particular, in some embodiments, control system 250 monitors the amount of one or more of the sensor streamers 106A-F paid into the onboard winches and determines when a streamer position device 130, 132 is likely approaching the winch (or some other structural feature). Upon noting that a streamer position device 130, 132 is within a predetermined distance (along the sensor streamer) from either the vessel 102 or the winch, control system 250 further causes the winch to transition from a first pay in speed to a second slower pay in speed to allow personnel to remove the streamer position device (e.g., devices 130, 132) before it is taken up on the winch along with the sensor streamer. The control system 250 may then determine that a sufficient length of the sensor streamer has been paid in such that the previous location of the streamer position device (e.g., devices 130, 132) has now been wound onto the winch, and as a result may cause the winch to increase the pay in speed from the second pay in speed back to the first pay in speed. Therefore, in these embodiments control system 250 may optimize the retraction process of the sensor streamers 106A-F such that they may be continuously paid onto their corresponding winches, and also allow attached components, such as, for example, streamer position devices 130, 132 to be removed. In other embodiments, the second pay in speed discussed above may be equal to zero such that control system 250 may completely stop the winch when it is determined that the streamer position device 130, 132 is within a predetermined distance from vessel 102 or the winch itself. After noting that a sufficient amount of time has elapsed since stopping the winch (e.g., enough time to allow personnel to remove the streamer position device 130, 132 from the sensor streamer), the control system 250 may then reinitiate the winching of the sensor streamer (e.g., at the first pay in speed).

In other embodiments, upon noting that a streamer position device 130, 132 is within a predetermined distance (along the sensor streamer) from either the vessel 102 or the winch, control system 250 further causes the winch to transition from a first pay in speed to a second slower pay in speed. The second slower pay in speed can make it easier for personnel to stop the winch at an appropriate time and remove the streamer position device (e.g., devices 130, 132). In an embodiment, when the personnel restart the winch, the control system 250 may cause the winch to resume the first pay in speed.

In addition, in some embodiments, the control system 250 may also monitor the amount of one or more of the sensor streamers 106A-F paid out from the onboard winches and determine when an installation position for one of the streamer position devices 130, 132 is likely approaching the payout point of the winch (i.e., the point where the streamer is no longer in contact with the winch) or some other structural feature. Upon noting that an installation position for one of the streamer position devices 130, 132 is within a predetermined distance (along the sensor streamer) from the payout point of the winch, control system 250 further causes the winch to transition from a first payout speed to a second slower payout speed to allow personnel to install the streamer position device (e.g., devices 130, 132) or to stop the winch at an appropriate time and then install the streamer position device. The control system 250 may then determine that a sufficient length of the sensor streamer has been paid out such that the location of the streamer position device (e.g., devices 130, 132) has now been fully deployed from the vessel 102, and as a result may cause the winch to increase the payout speed from the second payout speed back to the first payout speed. In other embodiments, the second payout speed discussed above may be equal to zero such that control system 250 may completely stop the winch when it is determined that the installation position of the streamer position device 130, 132 is at the payout point of the winch. After noting that a sufficient amount of time has elapsed since stopping the winch (e.g., enough time to allow personnel to install the streamer position device 130, 132 onto the sensor streamer), the control system 250 may then reinitiate the winching of the sensor streamer (e.g., at the first payout speed).

References to "one embodiment," "an embodiment," "a particular embodiment," and "some embodiments," indicate that a particular element or characteristic is included in at least one embodiment of the invention. Although the phrases "in one embodiment," "an embodiment," "a particular embodiment," and "some embodiments," may appear in various places, these do not necessarily refer to the same embodiment.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method for determining the presence or absence of a tangle of a line associated with geophysical survey equipment, the method comprising:
    determining, by a computer system onboard a tow vessel, a distance between the tow vessel and a predetermined point along a line being towed by the tow vessel;
    adjusting, by a winch onboard the tow vessel, a length of the line from the tow vessel and determining, by the computer system, the length of the line;
    determining, by the computer system, a change in the distance a predetermined amount of time after adjusting the length of the line; and
    determining, by the computer system, whether a difference between the change in the distance and the adjustment of the length exceeds a threshold value thereby indicating the presence or absence of a tangle associated with the line.

2. The method of claim 1, wherein the line is a sensor streamer;
    wherein the adjusting comprises paying out a payout length of the line;
    wherein the determining whether the difference between the change in the distance and the adjustment of the length exceeds a threshold value comprises determining whether a difference between the change in the distance and the payout length exceeds a threshold value.

3. The method of claim 2, further comprising determining, by the computer system, the predetermined amount of time based on at least one selected from the group consisting of:
    the length of the sensor streamer deployed from the tow vessel;
    an amount of tension in the sensor streamer;
    an amount of current experienced by the sensor streamer;
    a change in heading of the tow vessel;
    a payout rate of the sensor streamer; and
    a speed of the tow vessel.

4. The method of claim 2, further comprising determining, by the computer system, the predetermined amount of time based on a tension in the sensor streamer deployed from the tow vessel; and
    increasing, by the computer system, the predetermined amount of time as the tension in the sensor streamer decreases.

5. The method of claim 2, further comprising determining, by the computer system, the predetermined amount of time based on a speed of the tow vessel and a payout rate of the sensor streamer; and
    adjusting, by the computer system, the predetermined amount of time in response to a mismatch in the speed of the tow vessel and the payout rate of the sensor streamer.

6. The method of claim 2, further comprising:
    defining the threshold value based on a shape of the sensor streamer.

7. The method of claim 2, further comprising activating, by the computer system onboard the tow vessel, an alarm if the difference exceeds the threshold value.

8. The method of claim 7, further comprising:
    stopping, by the computer system onboard the tow vessel, further payout of the sensor streamer if the alarm is not acknowledged within one selected from the group consisting of:
        a predetermined time interval; and
        a predetermined amount of payout length of the sensor streamer.

9. The method of claim 2, wherein determining the distance between the tow vessel and the predetermined point comprises measuring, by the computer system onboard the tow vessel, a distance between a reference point on the tow vessel and a tail buoy disposed at a distal end of the sensor streamer.

10. The method of claim 2, further comprising:
   determining, by the computer system onboard the vessel, a second distance between the tow vessel and the predetermined point along the sensor streamer;
   withdrawing, by the winch onboard the tow vessel, a second length of the sensor streamer to the tow vessel;
   determining, by the computer system onboard the tow vessel, a change in the second distance a second predetermined amount of time after withdrawing of the second length of the sensor streamer; and
   determining, by the computer system, whether a second difference between the change in the second distance and the second length exceeds a second threshold value.

11. A system comprising:
   a tow vessel;
   a winch aboard the tow vessel;
   a sensor streamer coupled to the winch, wherein the winch is configured to payout the sensor streamer; and
   a computer system aboard the tow vessel, the computer system comprising a processor coupled to a memory, the computer system coupled to the winch;
   the memory storing a program that, when executed by the processor of the computer system, causes the processor to:
      determine a distance between the tow vessel and a predetermined point along the sensor streamer;
      cause the winch to payout a length of the sensor streamer from the tow vessel and determine the length of the sensor streamer;
      determine a change in the distance a predetermined time after the payout of the sensor streamer; and
      determine whether a difference between the change in the distance and the length exceeds a threshold value thereby indicating the presence or absence of a tangle associated with the sensor streamer.

12. The system of claim 11, wherein the program further causes the processor to compute the predetermined time such that the predetermined time accounts for a lag in a movement of the predetermined point corresponding to the payout of the sensor streamer from the tow vessel.

13. The system of claim 12, wherein the program further causes the processor to compute the predetermined time based on at least one selected from the group consisting of:
   a total length of the sensor streamer deployed from the tow vessel;
   an amount of tension in the sensor streamer;
   an amount of current experienced by the sensor streamer;
   a change in heading of the tow vessel;
   a payout rate of the sensor streamer; and
   a speed of the tow vessel.

14. The system of claim 11, wherein the program further causes the processor to:
   compute the predetermined amount of time based on a tension in the sensor streamer deployed from the tow vessel; and
   increase the predetermined amount of time in response to a decrease in the tension in the sensor streamer.

15. The system of claim 11, wherein the program further causes the processor to:
   compute the predetermined amount of time based on a speed of the tow vessel and a payout rate of the sensor streamer; and
   adjust the predetermined amount of time in response to a mismatch in the speed of the tow vessel and the payout rate of the sensor streamer.

16. The system of claim 11, wherein the predetermined time ranges from 10 seconds to 2 minutes, inclusive.

17. The system of claim 11, wherein the threshold value is less than or equal to 10% of the length.

18. The system of claim 11, wherein the program further causes the processor to activate an alarm if the difference exceeds the threshold value.

19. The system of claim 18, wherein the program further causes the processor to stop all payout of the sensor streamer if the alarm is not acknowledged within one selected from the group consisting of:
   a predetermined period of time; and
   a predetermined amount of payout length of the sensor streamer.

20. The system of claim 19, wherein the program further causes the processor to stop all payout of the sensor streamer if the alarm is not acknowledged within 75 meters of payout length of the sensor streamer.

21. The system of claim 11, wherein the predetermined point is disposed on a tail buoy coupled to a distal end of the sensor streamer.

22. The system of claim 11, wherein the predetermined point is disposed on a sensor disposed between a proximal end and a distal end of the sensor streamer.

23. A non-transitory computer readable medium storing a program that, when executed by a processor, causes the processor to:
   determine a distance between a tow vessel and a predetermined point along a sensor streamer extending from the tow vessel;
   cause a winch aboard the tow vessel to payout a length of the sensor streamer from the tow vessel and determine the length of the sensor streamer;
   determine a change in the distance a predetermined time after the payout of the sensor streamer; and
   determine whether a difference between the change in the distance and the length exceeds a threshold value thereby indicating the presence or absence of a tangle associated with the sensor streamer.

24. The non-transitory computer readable medium of claim 23, wherein the program further causes the processor to compute the predetermined time such that the predetermined time accounts for an expected lag in a movement of the predetermined point corresponding to the payout of the sensor streamer from the tow vessel.

25. The non-transitory computer readable medium of claim 24, wherein the program further causes the processor to compute the predetermined time based on at least one selected from the group consisting of:
   a total length of the sensor streamer deployed from the tow vessel;
   an amount of tension in the sensor streamer;
   an amount of current experienced by the sensor streamer;
   a change in heading of the tow vessel;
   a payout rate of the sensor streamer; and
   a speed of the tow vessel.

26. The non-transitory computer readable medium of claim 24, wherein the program further causes the processor to:
   compute the predetermined amount of time based on a tension in the sensor streamer deployed from the tow vessel; and
   increase the predetermined amount of time in response to a decrease in the tension in the sensor streamer.

27. The non-transitory computer readable medium of claim 24 wherein the program further causes the processor to:

compute the predetermined amount of time based on a speed of the tow vessel and a payout rate of the sensor streamer; and adjust the predetermined amount of time in response to a mismatch in the speed of the tow vessel and the payout rate of the sensor streamer.

28. The non-transitory computer readable medium of claim 23, wherein the predetermined time is between 10 seconds and 2 minutes, inclusive.

29. The non-transitory computer readable medium of claim 23, wherein the threshold value is less than or equal to 10% of the length.

30. The non-transitory computer readable medium of claim 23, wherein the program further causes the processor to activate an alarm if the difference exceeds the threshold value.

31. The non-transitory computer readable medium of claim 30, wherein the program further causes the processor to stop all payout of the sensor streamer if the alarm is not acknowledged within one selected from the group consisting of:

a predetermined period of time; and a predetermined amount of payout length of the sensor streamer.

32. The non-transitory computer readable medium of claim 31, wherein the program further causes the processor to stop all payout of the sensor streamer if the alarm is not acknowledged within 75 meters of payout length of the sensor streamer.

33. The non-transitory computer readable medium of claim 23, wherein the predetermined point is disposed on a tail buoy coupled to a distal end of the sensor streamer.

34. The non-transitory computer readable medium of claim 23, wherein the predetermined point is disposed on a sensor disposed between a proximal end and a distal end of the sensor streamer.

35. The non-transitory computer readable medium of claim 23, wherein the program further causes the processor to:

cause the winch to pay in the sensor streamer;

determine that a streamer position device is within a predetermined distance from the winch, wherein the streamer position device is disposed at a position along the sensor streamer;

cause the winch to slow the pay in of the sensor streamer from a first pay in speed to a second pay in speed;

determine that the position along the sensor streamer has been wound onto the winch; and cause the winch to increase the pay in of the sensor streamer from the second pay in speed to the first pay in speed.

36. A system comprising:

a means for sensing geophysical signals in water;

a means for towing the means for sensing as part of an offshore geophysical survey;

a means for deploying the means for sensing, the means for deploying coupled to the means for towing;

a means for monitoring deployment and detecting tangles of the means for sensing when being deployed from the means for deploying; the means for monitoring is configured to:

determine a distance between the means for towing a predetermined point along the means for sensing;

cause the means for deploying to payout an additional length of the means for sensing from the means for towing, and determine the additional length of the means for sensing;

determine a change in the distance a predetermined time after the payout of the additional length of the means for sensing; and determine whether a difference between the change in the distance and the additional length exceeds a threshold value thereby indicating the presence or absence of a tangle associated with the means for sensing.

37. The system of claim 36, wherein the means for monitoring is further configured to calculate the predetermined time based on at least one selected from the group consisting of: a total length of the means for sensing deployed from the means for towing; an amount of tension in the means for sensing; an amount of water current experienced by the means for sensing; a change in heading of the means for towing; a payout rate of the means for sensing; and a speed of the means for towing.

38. The system of claim 36, wherein the means for monitoring is further configured to:

determine the predetermined amount of time based on a tension in the means for sensing deployed from the means for towing; and increase the predetermined amount of time in response to a decrease in the tension in the means for sensing.

39. The system of claim 36, wherein the means for monitoring is further configured to:

compute the predetermined amount of time based on a speed of the means for towing and a payout rate of the means for sensing; and adjust the predetermined amount of time in response to a mismatch in the speed of the means for towing and the payout rate of the means for sensing.

40. A method of deploying a sensor streamer from a tow vessel in a geophysical survey, including: measuring, by a control system onboard the tow vessel, a distance between the tow vessel and a tail buoy of the sensor streamer; and paying out the sensor streamer from the tow vessel by a winch aboard the tow vessel;

wherein the improvement comprises:

commanding, by the control system, the winch to payout an incremental length of the sensor streamer from the tow vessel and determining the incremental length of the sensor streamer;

measuring, by the control system, a change in the distance a predetermined time after the payout of the incremental length of the sensor streamer; and sounding an alarm if a difference between the change in the distance and the length is less than a threshold value thereby indicating the presence of a tangle associated with the sensor streamer;

thereby detecting the tangle early in the formation of the tangle.

41. The method claim 40 further comprising computing, by the control system, the predetermined time such that the predetermined time accounts for lag in a movement of the predetermined point corresponding to the payout of the sensor streamer from the tow vessel.

42. The method of claim 41 further comprising:

computing, by the control system, the predetermined amount of time based on a tension in the sensor streamer deployed from the tow vessel; and increasing, by the control system, the predetermined amount of time in response to a decrease in the tension in the sensor streamer.

43. The method of claim 41 further comprising:
computing, by the control system, the predetermined amount of time based on a speed of the tow vessel and a payout rate of the sensor streamer; and
adjusting, by the control system, the predetermined amount of time in response to a mismatch in the speed of the tow vessel and the payout rate of the sensor streamer.

* * * * *